Dec. 4, 1962 B. B. BAUER 3,066,880

TAPE MAGAZINE

Filed Sept. 23, 1959

INVENTOR
BENJAMIN B. BAUER
BY
Brumbaugh, Free, Graves & Donohue
HIS ATTORNEYS

3,066,880
TAPE MAGAZINE

Benjamin B. Bauer, Stamford, Conn., assignor to Minnesota Mining & Manufacturing Company, St. Paul, Minn., a corporation of Delaware Filed Sept. 23, 1959, Ser. No. 841,808
7 Claims. (Cl. 242—55.13)

This invention relates to magazines or cartridges for reeled strip materials and, more particularly, to a new and improved tape magazine or cartridge embodying novel and effective mechanism for preventing inadvertent tape spillage.

The copending application of John D. Goodell, Barbara Ivins, John C. Wistrand and Vasil Tasi, Serial No. 837,716, filed September 2, 1959, for "Magnetic Tape Magazine Changer Mechanism," discloses automatically operated magnetic tape recorder-reproducer mechanism which utilizes cartridges, each containing a reel of tape. While in the tape transport position in the machine, the spool on which the tap is wound is coupled to the mechanism in such a way that no tape spillage is possible. However, in order to prevent spillage in handling, it is desirable to provide means for preventing rotation of the spool on which the tape is wound relative to the cartridge.

It is an object of the invention, therefore, to provide a new and improved cartridge embodying simple yet effective means for locking a reel releasably against rotation in the cartridge.

A further object of the invention is to provide a new and improved cartridge of the above character which incorporates means for automatically releasing the reel when the cartridge is in the tape transport position in a machine of the type disclosed in the aforementioned copending application.

These and other objects are attained, according to the invention, by providing a releasable mechanical coupling between the reel on which the tape is wound and the cartridge in which the reel is mounted. In a typical embodiment, the mechanical coupling may comprise a dog pivotally mounted in the hub of the reel and having a detent portion normally urged by means such as a spring into cooperating relation with stop means formed on the inside wall of the cartridge. The dog also has a portion actuatable from inside the hub by means of which the dog can be disengaged from the stop means in the cartridge to permit tape on the reel to be reeled or unreeled as required.

For a better understanding of the invention, reference is made to the following detailed description of a representative embodiment, taken in conjunction with the accompanying drawings, in which.

Figure 1:
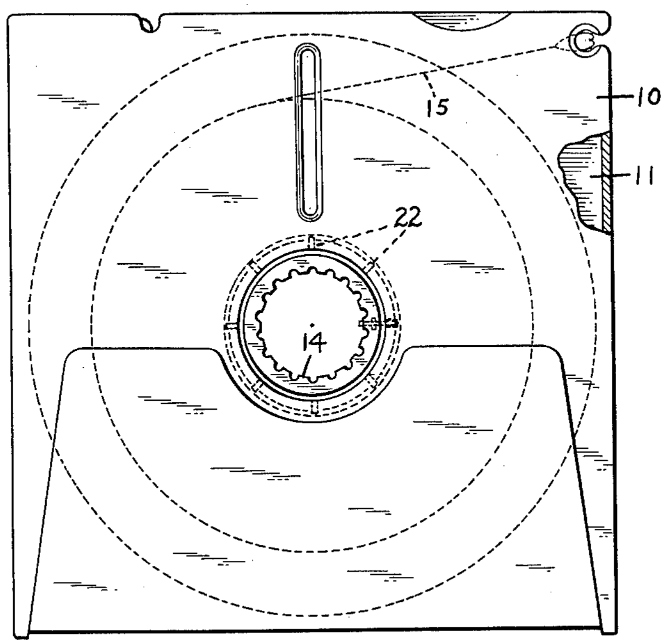
FIG. 1 is a plan view of a tape cartridge constructed according to the invention.

In FIG. 1, the cartridge is of the type disclosed in the aforementioned copending application Serial No. 837,716 and it comprises mating front and back portions 10 and 11 cemented or otherwise secured together in which are formed centrally located openings 12 and 13. The openings 12 and 13 form bearings in which is journalled a hub 14 on which strip material such as a magnetic tape 15 is adapted to be reeled.

Figures 2, 3, 4, 5:
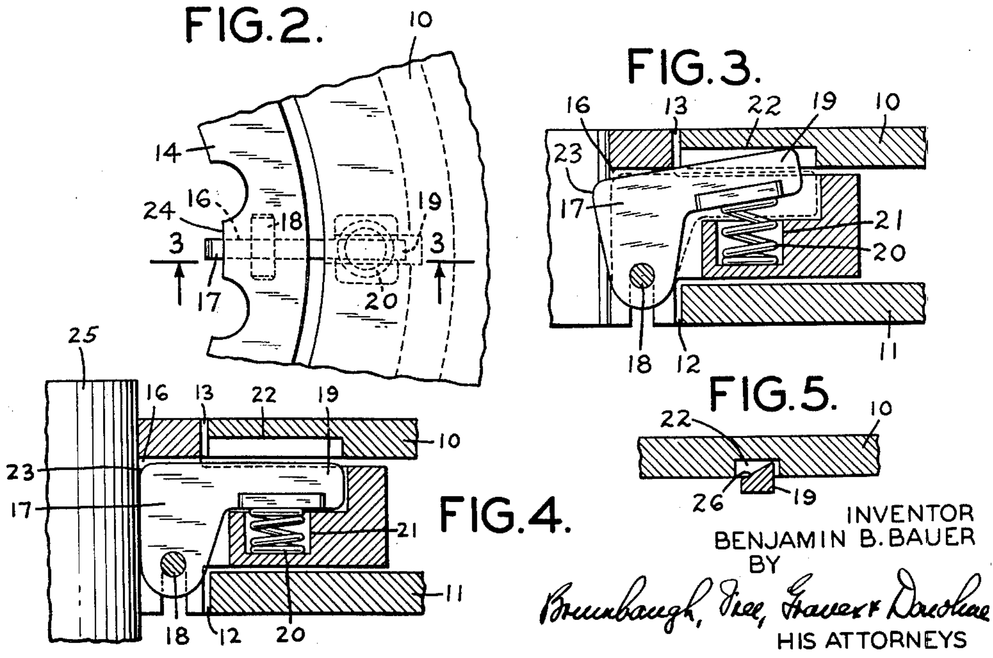
FIG. 2 is a partial enlarged view in plan showing means according to the invention for coupling the tape reel releasably to the cartridge.
FIG. 3 is a view in axial section taken along the line 3—3 of FIG. 2, looking in the direction of the arrows.
FIG. 4 is a view in longitudinal section showing how the coupling can be released when the cartridge is mounted on the spindle of tape recording-reproducing mechanism of the type described above.
FIG. 5 is a view in partial section taken transversely of one of the slots 22 and showing a modified form of dog capable of permitting ratcheting action of the hub relatively to the cartridge.

Formed in the hub 14 is an axially and radially extending slot 16 which receives a member 17 for mechanically coupling the hub 14 releasably to the cartridge. The member 17 is pivotally mounted on a pin 18 extending across the slot 16 into the hub 14. The member 17 has a detent portion 19 which is normally urged by a spring 20 towards the inside cartridge wall defined by the front cartridge portion 10. The spring 20 is seated in a well 21 formed in the hub 14 and it engages the member 17 as shown in FIG. 3. The detent portion 19 is adapted to be received in any one of a plurality of radially extending slots 22 formed in the inside wall of the cartridge front portion 10 which serve as stops.

With the detent portion 19 in any one of the slots 22, the hub 14 is mechanically coupled to the cartridge. In this position, the hub 14 is held securely against rotation so that there is no possibility of tape spillage in handling.

The coupling member 17 also has an actuator portion 23 which extends inwardly from the inside wall 24 of the hub 14. By moving the actuator member 17 manually against the spring 20, the detent portion 19 can be moved out of the slot 22 so that the tape 15 can be reeled on or unreeled from the hub 14 as required. Also, when the cartridge is loaded on a spindle 25 (FIG. 4) slightly smaller in diameter than the inside hub wall 24 as in recording-reproducing apparatus of the type described in the aforementioned copending application Serial No. 837,716, the spindle will move the actuator portion 23 outwardly, releasing the hub 14 from the cartridge so that the tape 15 can be reeled and unreeled under the control of the apparatus.

While the detent portion 19 is shown urged towards the front cartridge portion, it will be understood that by rearrangement of the parts, it could be urged towards the rear cartridge portion, in which case slots like the slots 22 would be formed in the inside wall of the rear cartridge portion 11. Also, any suitable pivotal mounting may be used in place of the pin 18.

FIG. 5 shows a modification in which the surface 26 of the detent portion 19 which is adapted to enter one of the slots 22 is tapered downwardly from side-to-side so that it will detent positively in one direction of rotation, but will freely ratchet in the opposite direction without loading the spindle. The direction of free motion is such as to allow the tape to be wound on its reel but not unwound therefrom.

It will be understood that the invention provides a novel cartridge for tape or the like having a simple yet highly effective mechanism for mechanically coupling the hub on which the tape is wound releasably to the cartridge. By virtue of the cooperating detent and slot structure shown, the coupling is positive so that no tape spillage can occur in handling. Yet the coupling can readily be released manually or when the cartridge is loaded on the spindle of recording-reproducing apparatus as described above. Also, the modification shown in FIG. 5 permits the tape to be readily wound up on the reel while preventing unreeling of the tape until the coupling is released.

The specific embodiment described above is merely illustrative and the invention is intended to comprehend all modifications thereof coming within the scope of the following claims.

I claim:

1. A cartridge for tape and the like comprising a housing including spaced apart front and rear walls having axially aligned openings therein, a hub journalled in said openings and having an axial bore to receive a spindle, a member pivotally mounted in said hub, said member having a detent portion movable axially of the hub towards one of said housing walls and an actuator portion extending into said bore and adapted to be moved out of said bore when a spindle is received therein, spring means normally urging said member detent portion towards said one housing wall, and means on said one housing wall adapted to cooperate with said member detent portion to couple said hub releasably to the housing.

2. A cartridge for tape and the like comprising a housing including spaced apart front and rear walls having axially aligned openings therein, a hub journalled in said openings and having a slot extending axially and radially therein, a member pivotally mounted in said slot for movement in a radial plane through said hub, said member having a detent portion movable towards and away from one of said housing walls and an actuator portion extending inwardly from said hub, spring means normally urging said detent portion towards said one housing wall, and means forming recesses on the inside of said one housing wall, said recesses being angularly spaced apart about the opening in said one wall and located so as to be capable of receiving said member detent portion therein to couple said hub releasably to the housing.

3. A cartridge for tape and the like comprising a housing having spaced apart front and rear walls, hub means journalled in said front and rear walls, detent means carried by said hub means, means formed on one of said walls adapted to cooperate with said detent means to serve as stop means therefor, ratchet means on said detent means preventing relative rotation between said hub means and the housing in one direction while permitting controlled relative rotation in the opposite direction, and means actuatable from inside said hub for moving said detent means away from said one wall.

4. A cartridge for tape and the like comprising a housing, a hub journalled in said housing and having an axial bore to receive a spindle, detent means carried by said hub, means normally urging said detent means axially of said hub into engagement with said housing, and actuator means, having a portion extending into said bore and adapted to be moved out of said bore when a spindle is received therein, for moving said detent means away from said housing.

5. A cartridge for tape and the like comprising a housing, a hub journalled in said housing and having an axial bore to receive a spindle, detent means carried by said hub, means formed on said housing adapted to cooperate with said detent means to serve as stop means for said hub, means normally urging said detent means axially of said hub towards said housing into cooperating relation with said stop means, and means, having a portion extending into said bore and adapted to be moved out of said bore when a spindle is received therein, for moving said detent means away from said housing to disable said stop means.

6. A cartridge for tape and the like comprising a housing, hub means journalled in said housing, cooperating means carried by said hub means and formed in said housing, respectively, for mechanically coupling the hub releasably to the housing so as to prevent relative rotation in one direction while permitting stepped rotation in the opposite direction, and means actuatable from inside said hub for rendering said coupling means ineffective.

7. In combination, a support member, a spindle mounted on said support member, a cartridge having a rotatable hub journalled therein and bored to receive said spindle to mount said cartridge detachably on said support member, detent means movable axially of said hub into and out of engagement with said cartridge, actuator means for said detent means, said actuator means extending into said bore when said detent means is engaged with said cartridge and being adapted to be moved out of said bore to disengage said detent means, and yieldable means normally urging said detent means into engagement with said cartridge and said actuator means into said bore, whereby said hub is mechanically coupled to said cartridge in the absence of a spindle in said bore and is uncoupled from said cartridge upon insertion of said spindle in said bore in mounting said cartridge on said support member.

References Cited in the file of this patent

UNITED STATES PATENTS

| | | |
|---|---|---|
| 2,161,341 | Fairbanks | June 6, 1939 |
| 2,455,187 | Owens | Nov. 30, 1948 |
| 2,778,880 | Eash | Jan. 22, 1957 |
| 2,782,263 | Hoehn et al. | Feb. 19, 1957 |
| 2,879,341 | Kucher | Mar. 24, 1959 |